US011560254B2

(12) United States Patent
Coleman, Jr.

(10) Patent No.: US 11,560,254 B2
(45) Date of Patent: Jan. 24, 2023

(54) CONTAINER WITH INTERIOR AND EXTERIOR GRAPHICS

(71) Applicant: Packaging Corporation of America, Lake Forest, IL (US)

(72) Inventor: Casey E. Coleman, Jr., Rutledge, GA (US)

(73) Assignee: Packaging Corporation of America, Lake Forest, IL (US)

( * ) Notice: Subject to any disclaimer, the term of this patent is extended or adjusted under 35 U.S.C. 154(b) by 0 days.

(21) Appl. No.: 16/994,437

(22) Filed: Aug. 14, 2020

(65) Prior Publication Data

US 2021/0053716 A1 Feb. 25, 2021

Related U.S. Application Data

(60) Provisional application No. 62/891,187, filed on Aug. 23, 2019.

(51) Int. Cl.
| | | |
|---|---|---|
| *B65D 5/42* | (2006.01) | |
| *B65D 5/02* | (2006.01) | |
| *B32B 33/00* | (2006.01) | |
| *B65D 5/54* | (2006.01) | |
| *B31B 120/10* | (2017.01) | |
| *B31B 105/00* | (2017.01) | |
| *B31B 110/35* | (2017.01) | |

(52) U.S. Cl.
CPC ............ *B65D 5/4212* (2013.01); *B32B 33/00* (2013.01); *B65D 5/0227* (2013.01); *B65D 5/0236* (2013.01); *B65D 5/541* (2013.01); *B31B 2105/0024* (2017.08); *B31B 2110/35* (2017.08); *B31B 2120/102* (2017.08)

(58) Field of Classification Search
CPC .. B65D 5/4212; B65D 5/0227; B65D 5/0236; B65D 5/541; B65D 5/4216; B65D 5/542; B65D 5/5445; B65D 2203/00; B65D 5/4229
USPC .................... 229/242, 103, 240, 116.1, 147; 206/459.5, 739, 831; 40/312
See application file for complete search history.

(56) References Cited

U.S. PATENT DOCUMENTS

| | | | | |
|---|---|---|---|---|
| 1,148,219 | A * | 7/1915 | Cornell | B65D 5/643 229/125.38 |
| 4,487,319 | A * | 12/1984 | Barrash | B65D 5/46032 206/427 |
| 6,059,179 | A * | 5/2000 | Giampapa | A45C 7/0095 206/457 |
| 6,347,704 | B1 | 2/2002 | Dixon | |
| 6,682,469 | B1 | 1/2004 | Knoerzer | |
| 6,948,616 | B2 * | 9/2005 | Gillani | B65D 5/4216 206/459.5 |
| 7,614,992 | B2 * | 11/2009 | Chandaria | B65D 5/4266 229/125 |
| 9,694,960 | B2 | 7/2017 | Conners et al. | |
| 2002/0134822 | A1 | 9/2002 | Mills | |

(Continued)

*Primary Examiner* — Christopher R Demeree
(74) *Attorney, Agent, or Firm* — Klarquist Sparkman, LLP

(57) ABSTRACT

A container is formed from a blank that has a first side and a second side. The first side can have one or more graphics. The container can include a base portion forming an enclosure and first and second overlap panels that collectively form a cover panel that can enclose the enclosure. Methods of constructing the container include forming the cover panel by securing the first and second overlap panels together.

18 Claims, 6 Drawing Sheets

(56) References Cited

U.S. PATENT DOCUMENTS

| | | | |
|---|---|---|---|
| 2004/0232039 A1* | 11/2004 | Daniels | B65D 5/321 206/736 |
| 2010/0224675 A1* | 9/2010 | Bell | B65D 5/4225 229/103 |
| 2018/0273238 A1* | 9/2018 | Wagner | B65D 5/6652 |

* cited by examiner

CONTAINER WITH INTERIOR AND EXTERIOR GRAPHICS

CROSS REFERENCE TO RELATED APPLICATION

This application claims the benefit of U.S. Provisional Application No. 62/891,187, filed Aug. 23, 2019. The prior application is incorporated herein by reference in its entirety.

FIELD

This disclosure relates generally to containers, including containers for use as delivery and display packages, and methods of manufacturing such containers.

BACKGROUND

Graphics can be used to create of attractive and informative containers for shipping and/or display. However, conventional systems often require complicated manufacturing processes. Improvements in such containers, and the methods of manufacturing the same are desirable.

SUMMARY

Disclosed herein are various embodiments of containers and methods of constructing the same.

In some embodiments, a container is provided that is formed from a blank that has a first side and a second side. The first side can have one or more graphics. The container can include a base portion forming an enclosure, the base portion being formed from a plurality of panels of the blank, the plurality of panels including a back panel, a bottom panel, a front panel, a left side wall, and a right side wall. First and second overlap panels can be provided. The first overlap panel can have a first end and a second end, with the first overlap panel extending from the back panel at the first end, and the first overlap panel having a back surface and a front surface. The second overlap panel can extend from the second end of the first overlap panel, with the second overlap panel having a back surface, a front surface, a first side, and a second side. Left and right side panels can be provided. The left side panel can extend from the second overlap panel along the first side and the right side panel can extend from the second overlap panel along the second side. The enclosure can have an interior surface formed by portions of the back panel, the bottom panel, the front panel, the left side wall, and the right side wall that are on the first side of the blank. A back surface of the first overlap panel can be secured to a back surface of the second overlap panel to form a cover panel that encloses the interior surface of the container, with the back surfaces of the first and second overlap panels being surfaces on the second side of the blank.

In some embodiments, the left side panel is secured to an exterior surface of the left side wall and the right side panel is secured to an exterior surface of the right side wall, the portion of the left side panel that is secured to the exterior surface of the left side wall is from the second side of the blank, and the portion of the right side panel that is secured to the exterior surface of the right side wall is from the second side of the blank.

In another embodiment, a method of forming a container from a blank comprises providing a blank with a first side and a second side, the first side having one or more graphics. The blank can include a base portion, a first overlap panel hingedly coupled to the base portion along a first joint, a second overlap panel hingedly coupled to the first overlap panel along a second joint, a left side panel hingedly coupled to the second overlap panel along a third joint, and a right side panel hingedly coupled to the second overlap panel along a fourth joint. The method further includes forming an enclosure from the base portion, the enclosure including a back panel, a bottom panel, a front panel, a left side wall, and a right side wall; forming a cover panel by folding the blank along the second joint and positioning the second side of the first overlap panel adjacent the second side of the second overlap panel; securing the second side of the first overlap panel to the second side of the second overlap panel; and folding the cover panel along the first joint to cover the enclosure.

In some embodiments, the method can include folding the left side panel along the third joint and securing it to the left side wall, and folding the right side panel along the fourth joint and securing it to the right side wall.

In some embodiments, the second side can be formed without any graphics.

The foregoing and other objects, features, and advantages of the invention will become more apparent from the following detailed description, which proceeds with reference to the accompanying figures.

DETAILED DESCRIPTION

Figure 1:
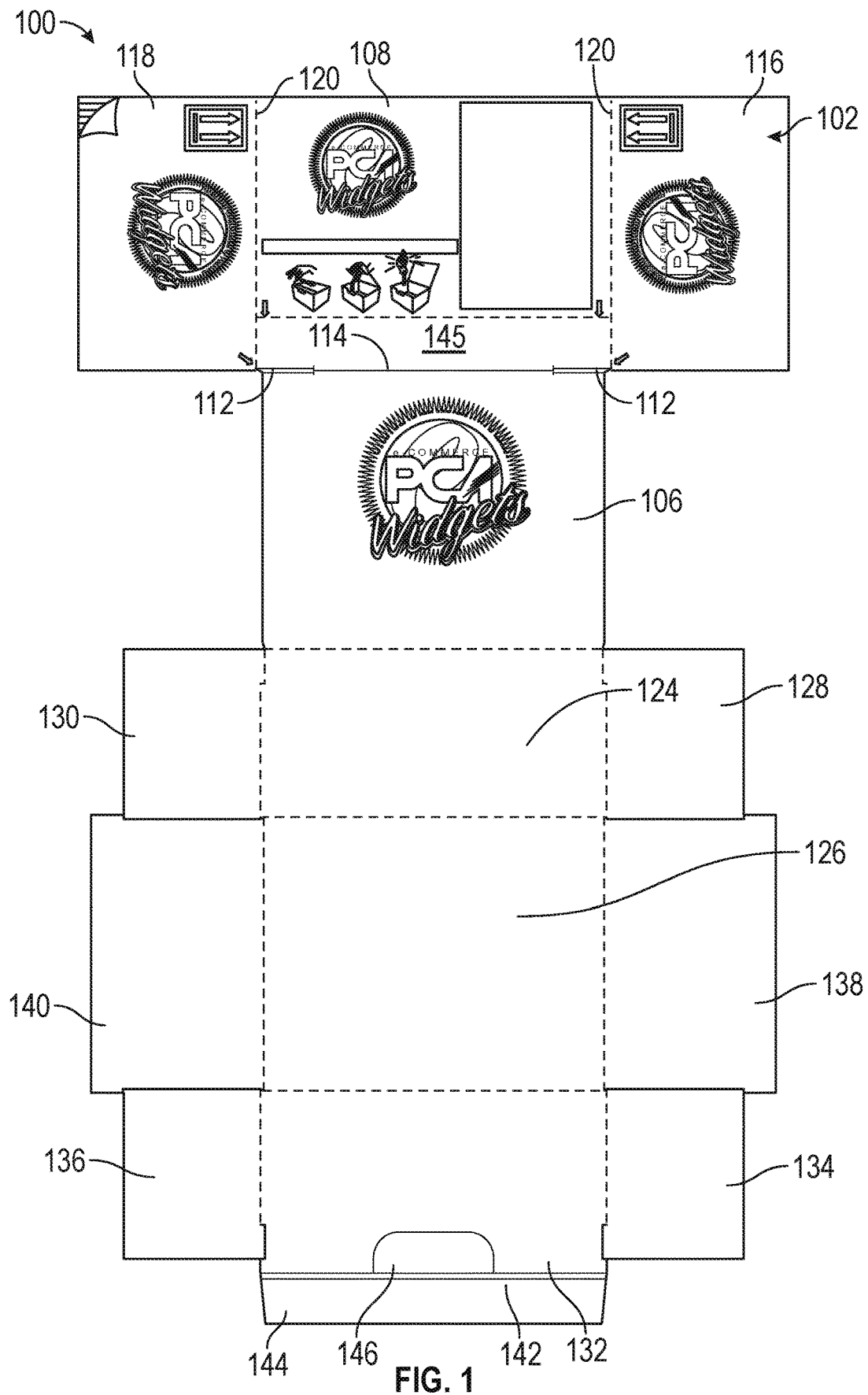
FIG. 1 illustrates a first side of a blank for constructing a container.

The detailed descriptions herein describe certain exemplary embodiments relating to containers and the construction of such containers.

General Considerations

As used in this application the singular forms "a," "an," and "the" include the plural forms unless the context clearly dictates otherwise. Additionally, the term "includes" means "comprises." Furthermore, as used herein, the term "and/or" means any one item or combination of items in the phrase. In addition, the term "exemplary" means serving as a non-limiting example, instance, or illustration. As used herein, the terms "e.g.," and "for example," introduce a list of one or more non-limiting embodiments, examples, instances, and/or illustrations.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "provide," "produce," "determine," and "select" to describe the disclosed methods. These terms are high-level descriptions of the actual operations that are performed. The actual operations that correspond to these terms will vary depending on the particular implementation and are readily discernible by one of ordinary skill in the art having the benefit of this disclosure.

As used herein, the term "container" refers to an article that is capable of holding one or more products or other physical articles. As used herein, the term "cardboard box" refers to a box formed from any of a variety of heavy paper-like materials, including, for example, cardstock, corrugated fiberboard, and/or paperboard. As used herein, the term "corrugated fiberboard" refers to fluted corrugated medium with one or more flat liner boards coupled thereto, such as a central corrugated layer with a first liner board on one side and a second liner board on another side of the central corrugated layer.

As used herein, the term "blank" refers to a flat sheet of material that is formed into a container, such as a flat sheet of corrugated paperboard. As used herein, the term "flat-formed" refers to an article that is manufactured from one or more flat pieces, such as a blank, that are manipulated into a different shape, such as by folding. As used herein, the term "hingedly coupled" refers to any manner of engagement between a first part of a blank relative to a second part of the blank which allows the first part to travel relative to the second part without the first part becoming disengaged from the second part, such as by one or more fold lines, one or more cut lines, and/or some combination thereof. As used herein, the term "cut line" refers to an area that includes a cut that extends at least partially through the blank to facilitate folding, tearing, and/or some other structural advantage. Cut lines can be straight, curved, or some other shape, and can include perforation lines in which the cut is not continuous along the length of the cut line (i.e., a perforated line is a cut line that is discontinuous).

As used herein, the terms "graphic" and "graphical element" refer to any visual design elements including, but not limited to, photos, logos, text, illustrations, instructions, advertisements, lines, shapes, patterns, and/or images of various kinds, as well as any combinations of these elements. The terms graphic and graphical element are not intended to be limiting and can incorporate any number of contiguous or non-contiguous visual features. A graphic can be applied to a surface of a material, such as a blank, in any suitable manner. For example, a graphic can be provided on a surface by printing, lamination, adhesive application, coating application (e.g., paint), embossing, and/or any other means.

As used herein, the terms "overlap" or "overlay" refer to a physical arrangement in which at least a portion of one member overlaps and/or covers at least a portion of another member. An overlap panel (or overlay panel) can contact the member that it at least partially overlaps with or it can be spaced-apart from the member.

For the purposes of this disclosure, relative terms such as "vertical", "horizontal", "top", "bottom", "front", "back", "end" and "sides" may be used. It should be understood, however, that the terms are used only for purposes of description, and are not intended to be used as limitations. Accordingly, the orientation of an object or a combination of objects may change without altering the scope of the invention.

Exemplary Containers and Methods of Constructing the Same

Figure 2:
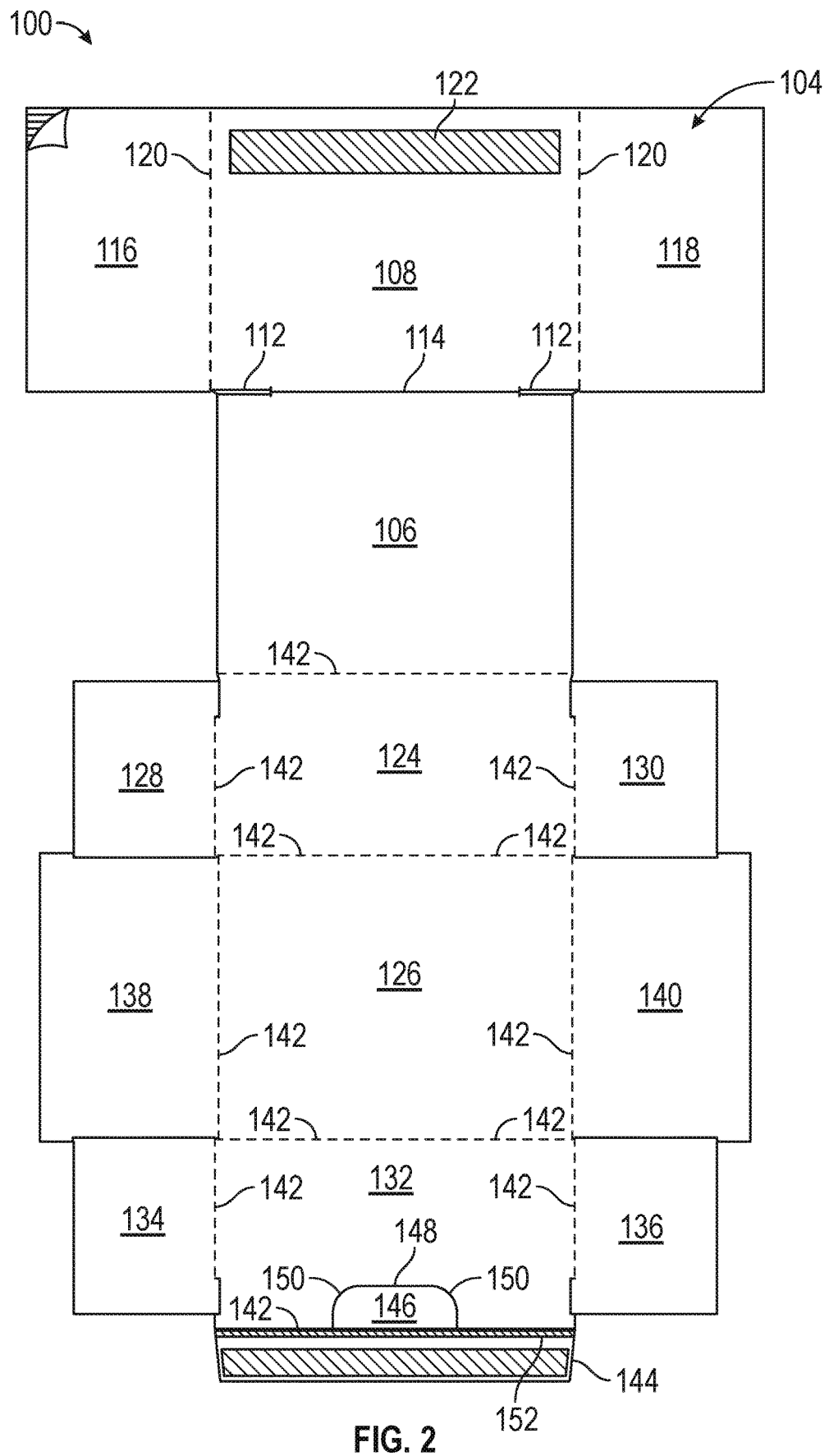
FIG. 2 illustrates a second side of the blank of FIG. 1.

FIGS. 1 and 2 illustrates an exemplary embodiment of a blank 100 that can be formed into a container, such as a cardboard box. FIG. 1 illustrates a first side 102 of blank 100 and FIG. 2 illustrates a second side 104. As described in more detail below, first side 102 can comprise one or more graphical elements that, when the container is constructed from the blank 100, can be displayed on both inside surfaces of the container (e.g., interior walls) and outside surfaces of the container (e.g., exterior walls).

Figure 5:
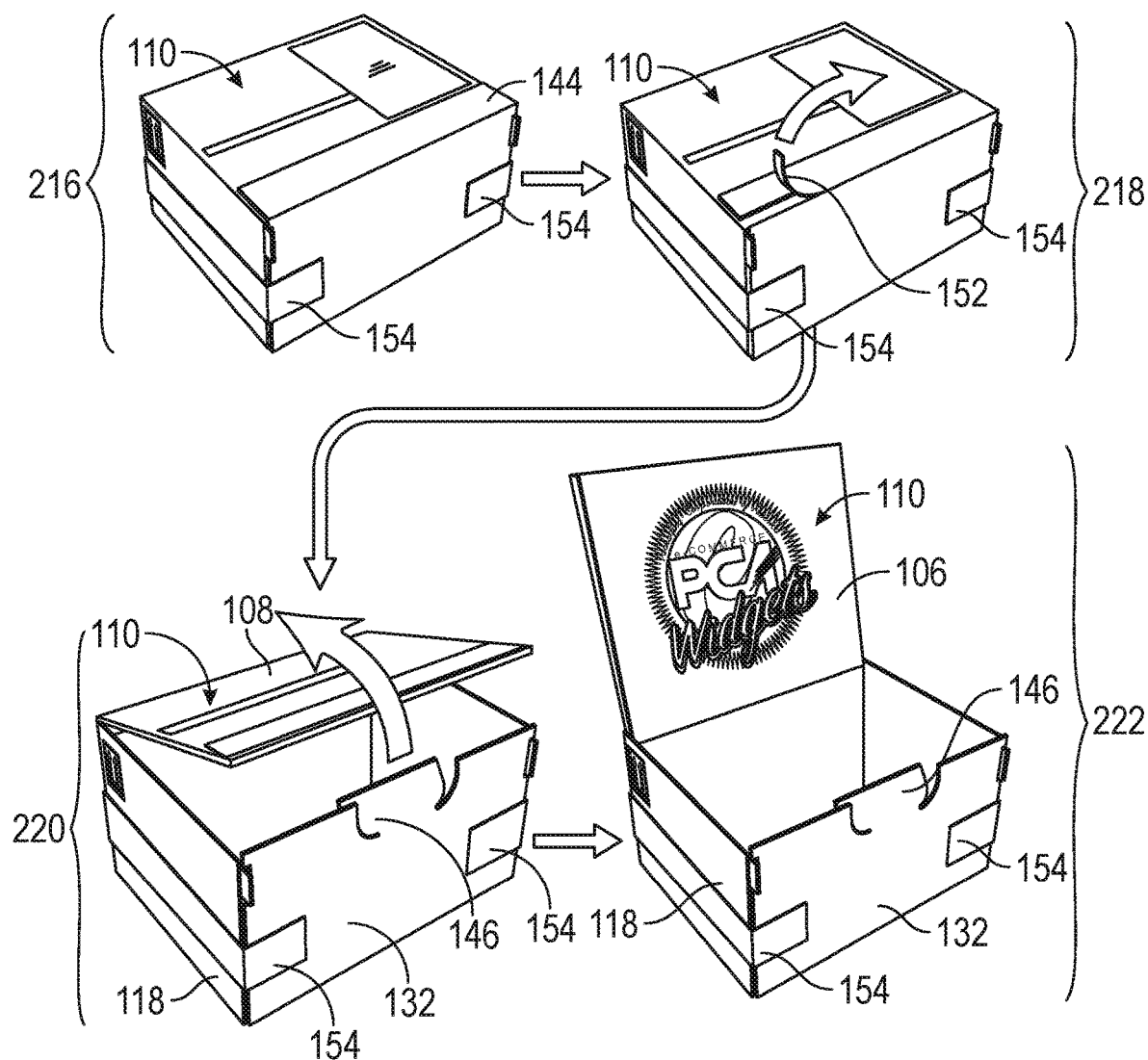
FIG. 5 illustrates an exemplary method for opening a container created from the blank of FIG. 1.

Blank 100 can include a first overlap panel 106 and a second overlap panel 108. As described in more detail below, first overlap panel 106 and second overlap panel 108 can be folded and secured to each other to form a cover panel 110 (FIG. 5). Overlap panels can also be referred to as overlay panels.

Second overlap panel 108 is hingedly coupled to first overlap panel 106. For each structure that is hingedly coupled herein, it should be understood that various structures can achieve the same or a similar result. For example, second overlap panel 108 can be hingedly coupled to first overlap panel 106 by one or more fold lines and/or one or more fold lines combined with one or more cut lines.

In the illustrated embodiment, a pair of substantially parallel fold lines 112 are provided at both sides of the joint formed between the second overlap panel 108 and the first overlap panel 106, and a cut line 114 extends therebetween. In this example, cut line 114 comprises a cut that extends through the entire blank along the length of cut line 114.

Second overlap panel 108 is also hingedly coupled to a first right-side panel 116 and a first left-side panel 118. In the illustrative embodiment, the joints formed between the second overlap panel 108 and the first right-side panel 116 and first left-side panel 118, respectively, can comprise cut lines 120. In this example, cut lines 120 comprise perforation lines that provide a line of weakness along their length to facilitate separation of the first right-side and first left-side panels 116, 118 from the second overlap panel 108.

As shown in FIG. 2, second overlap panel 108 can receive a bonding material, e.g., a glue or adhesive, at a first adhesion area 122. As discussed in more detail below, the bonding material secures the second overlap panel 108 to the first overlap panel 106 to form the cover panel 110. In other embodiments, the first and second overlap panels 106, 108 can be unsecured (i.e., no adhesive is applied) to each other in a folded arrangement.

First overlap panel 106 is also hingedly coupled to a base portion through a back panel 124. Back panel 124 is, in turn, hingedly coupled to a bottom panel 126, a first right-side flap 128, and a first left-side flap 130. Bottom panel 126 is hingedly coupled to a front panel 132, which is, in turn, hingedly coupled to a second right-side flap 134, and a second left-side flap 136. Bottom panel 126 is also hingedly coupled to a second right-side panel 138 and a second left-side panel 140.

In the illustrated embodiment, each joint 142 between the hingedly coupled members comprises a combination of a fold line and a cut line. The cut lines are perforated lines, with the cuts extending between adjacent folded sections of the fold line.

Front panel 132 is also hingedly coupled to an overlapping extension member 144 (outside glue lap) in the same manner as the other joints 142 described above. Overlapping extension member 144 can receive a bonding material, e.g., a glue or adhesive, so that it can engage with an exterior portion of cover panel 110 during construction, which is discussed in below.

Referring to FIG. 1, the bonding material can be provided on the surface of the extension member 144 and be configured to secure the extension member 144 to a portion 145 of second overlap panel 108 during construction. FIG. 2 illustrates an exemplary area of the bonding material, which is provided on the first side 102 of blank 100 (shown in FIG. 1).

Although the joints between each of the hingedly coupled members are described as being of one type or another above, it should be understood that these structures can vary so long as the nature of the joint are suitable for the construction of the containers described herein.

As shown in FIGS. 1 and 2, front panel 132 can also comprise an accessible opening that is covered by a tab 146. Tab 146 can be removable or hinged in some manner so that it can be pushed away from the front panel 132, allowing a user to access the opening left behind. In the illustrated embodiment, tab 146 is hingedly coupled to the front panel 132 by a folded line 148 and a pair of cut lines 150. However, it should be understood that tab 146 can be hingedly/removably coupled to the front panel in any suitable manner. For example, instead of pushing in downward, it could be hinged to push in upward (i.e., with a folded portion at a top area and perforated/cut portion(s) at a bottom area, or the entire tab joint could be perforated.

Figure 3:
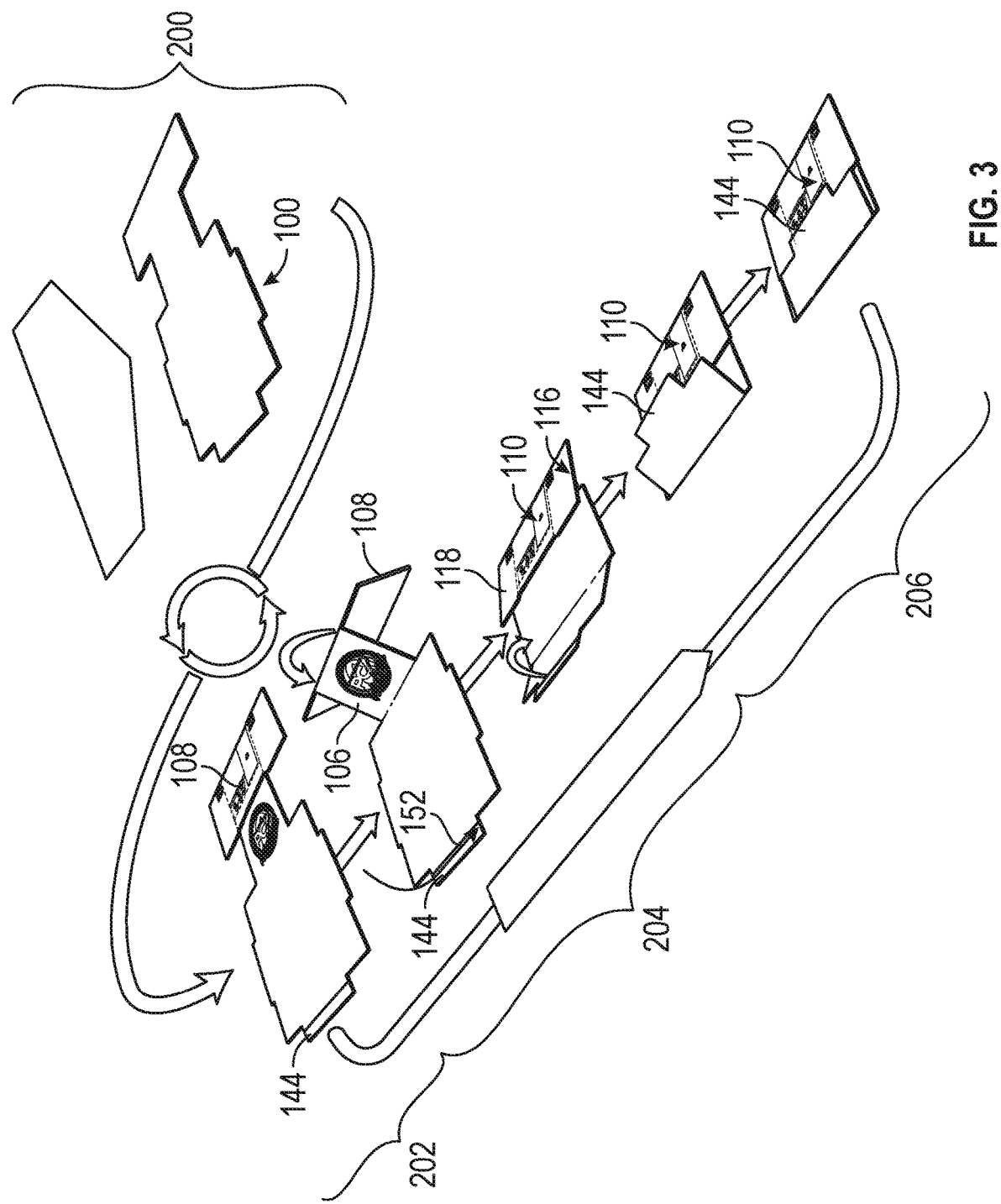
FIG. 3 illustrates various exemplary steps for creating a container from a blank.
Figure 4:
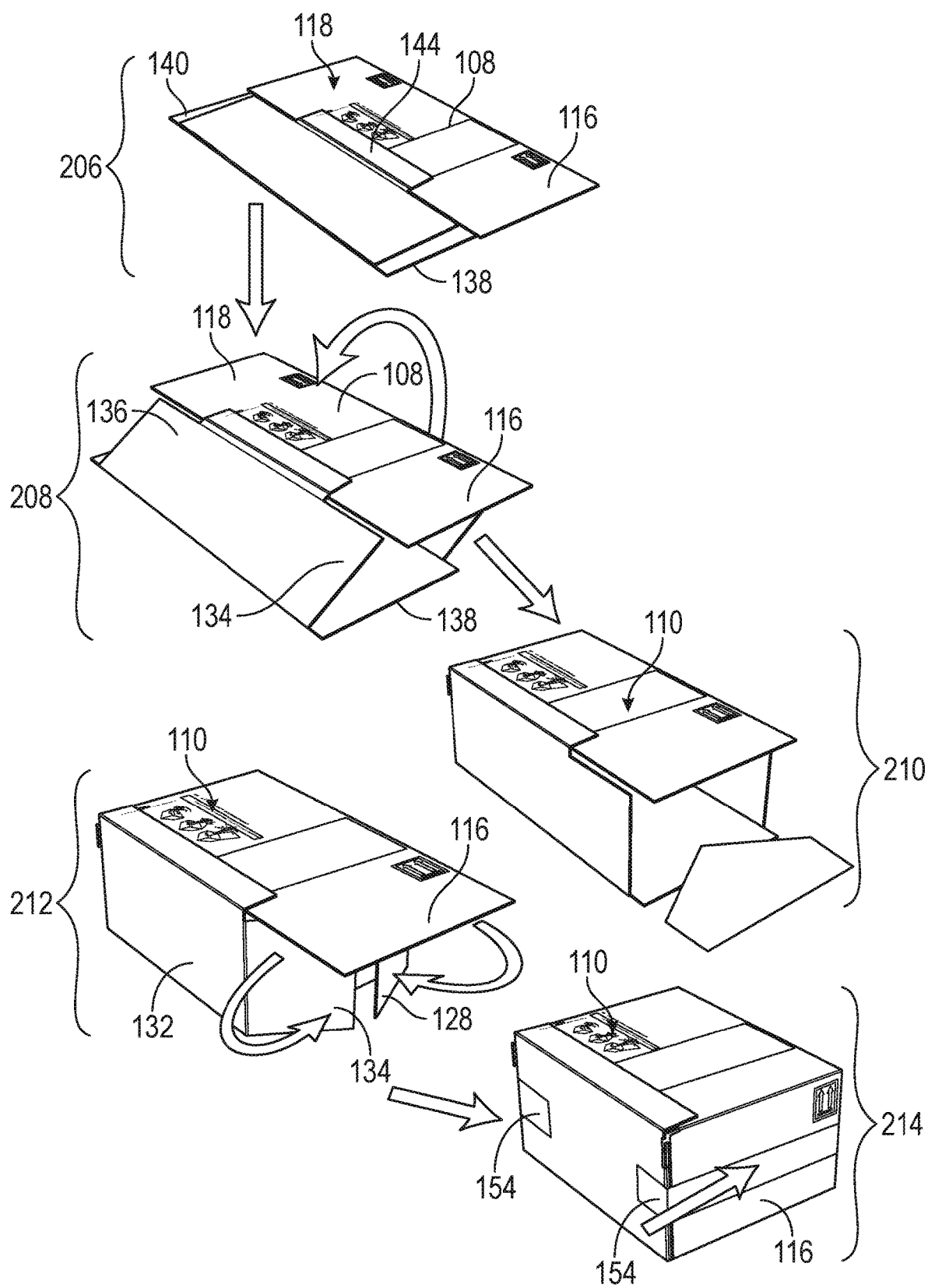
FIG. 4 illustrates various additional exemplary steps for creating a container from a blank.

FIGS. 3 and 4 illustrate the construction of a container formed from blank 100. As illustrated in these figures, although the blank 100 has graphics on only the first side 102 of the blank, the resulting container presents these graphics on both the inside and outside of the container. It is often desirable to provide containers with graphics on the inside and outside; however, conventional methods require at least two passes to deliver the graphic to both sides of the blank. For example, printing graphics on both sides of a conventional box or container requires one printing pass for each side. This methods disclosed herein simplify manufacturing by removing the requirement for multiple passes and, at the same time, can reduce the waste and labor costs associated with multiple-pass constructions.

Referring to FIG. 3, a method of assembling a container from a blank 100 is provided. As shown in FIG. 3, a blank 100 with one or more graphics on it can be formed by a press (e.g., a die cutter) a step 200. The blank 100 can be flipped so that the first side 102 (graphic side) faces up as shown in step 202. Then as shown in step 204, the second overlap panel 108 can be folded to overlap with first overlap panel 106. When folded, the bonding material at first adhesion area 122 of second overlap panel 108 comes into contact with an adjacent surface of first overlap panel 106, securing these two panels together.

In addition, step 204 illustrates the application of a tear strip 152 adjacent the joint between the front panel 132 and the extension member 144. The tear strip 152 can be any suitable material that can facilitate opening of the container. In some embodiments, the tear strip can comprise an adhesive tape that includes a filament that can be used to tear open the package along the length of the tear strip. The tear strip can be positioned parallel to the fluting to facilitate opening.

In other embodiments, the tear strip can be embedded in the material itself. For example, the tear strip can be placed between adjacent a fluted corrugated sheet of a corrugated fiberboard. In one embodiment, the orientation of the corrugated sheet can be adjusted so that the embedded tear strip is perpendicular to the fluting.

Instead of a tear strip, or in addition, mirror lines of perforation can be provided to the desired opening location (i.e., where tear strip 152 is shown in FIG. 5) to facilitate opening of the package. Mirrored lines of perforation, sometimes called a zipper strip, function to open the container in a similar manner to the tear strip described herein.

Next, as shown in step 206, the bonding material on the second side of extension member 144 can be brought into contact with the portion 145 of the first side of second overlap panel 108, thereby securing the extension member 144 to the second overlap panel 108.

Referring to FIG. 4, after the extension member 144 is secured to the second overlap panel 108, one of the right or left sides can be closed. For example, as shown in step 208, the first left-side flap 130, second left-side flap 136, first left-side panel 118, and second left-side panel 140 can be folded and secured in position to collectively form the left-side wall of the resulting container. The manner in which these members are folded together can vary. However, in the illustrated embodiment, second left-side panel 140 can be positioned so that it is visible from within the container (i.e., second left-side panel 140 is the innermost panel) and first left-side panel 118 can be positioned so that it is visible from outside the container (i.e., first left-side panel 118 is the outermost panel). First left-side flap 130 and second left-side flap 136 can be positioned therebetween. By forming the left side wall in this manner, both the interior-facing surface of the left side wall and the exterior facing surface of the left side wall are formed from the first side 102 (e.g., printed side) of the blank 100.

Referring to FIG. 4 again, in step 210 an article (e.g., a product or other item) can be inserted into the enclosure formed by the partially constructed container. Then, as shown in steps 212 and 214, the right side can be closed in the same manner as the left side. That is, the first right-side flap 128, second right-side flap 134, first right-side panel 116, and second right-side panel 138 can be folded and secured in position to collectively form the right-side wall of the resulting container. Again, by forming the right side wall in the same manner as the left side wall, both the interior-facing surface of the right side wall and the exterior facing surface of the right side wall are formed from the first side 102 (e.g., printed side) of the blank 100.

As shown in FIG. 4, panel 138 can be folded first with flaps 128, 134 folded over panel 138. Panel 116 can then be folded thereover. Other folding arrangements are possible. For example, flaps 128, 134 can be folded first with panel 138 enclosing flaps 128, 134. Panel 116 can then be folded thereover.

The left and right side walls can be secured by any suitable means. For example, step 214 illustrates one or more tapes 154 that extend from the side walls to the front and back panels. In addition, or as an alternative, to tape, other securing means can be used such as staples and adhesives.

FIG. 5 illustrates a manner in which the container can be opened after it has been sealed as described above. Step 216 shows the closed box and step 218 illustrates the tear strip 152 being pulled across the joint between the front panel 132 and the extension member 144 to open the box.

As shown in step 220, once the tear strip 152 is used to separate the front panel 132 and the extension member 144, a force can be applied to tab 146 to access the opening covered by the tab 146. By pulling upward on the front of cover panel 110, the container can be fully opened. As discussed above, in some embodiments, perforation lines (cut lines 120) can be provided facilitate separation of the first right-side and first left-side panels 116, 118 from the second overlap panel 108. Alternatively, other types of fold and/or cut lines can be provided to facilitate opening or, if the material of the blank can be torn without any such fold and/or cut lines or if greater structural integrity is required, no fold and/or cut lines can be provided along the joint.

Figure 6:
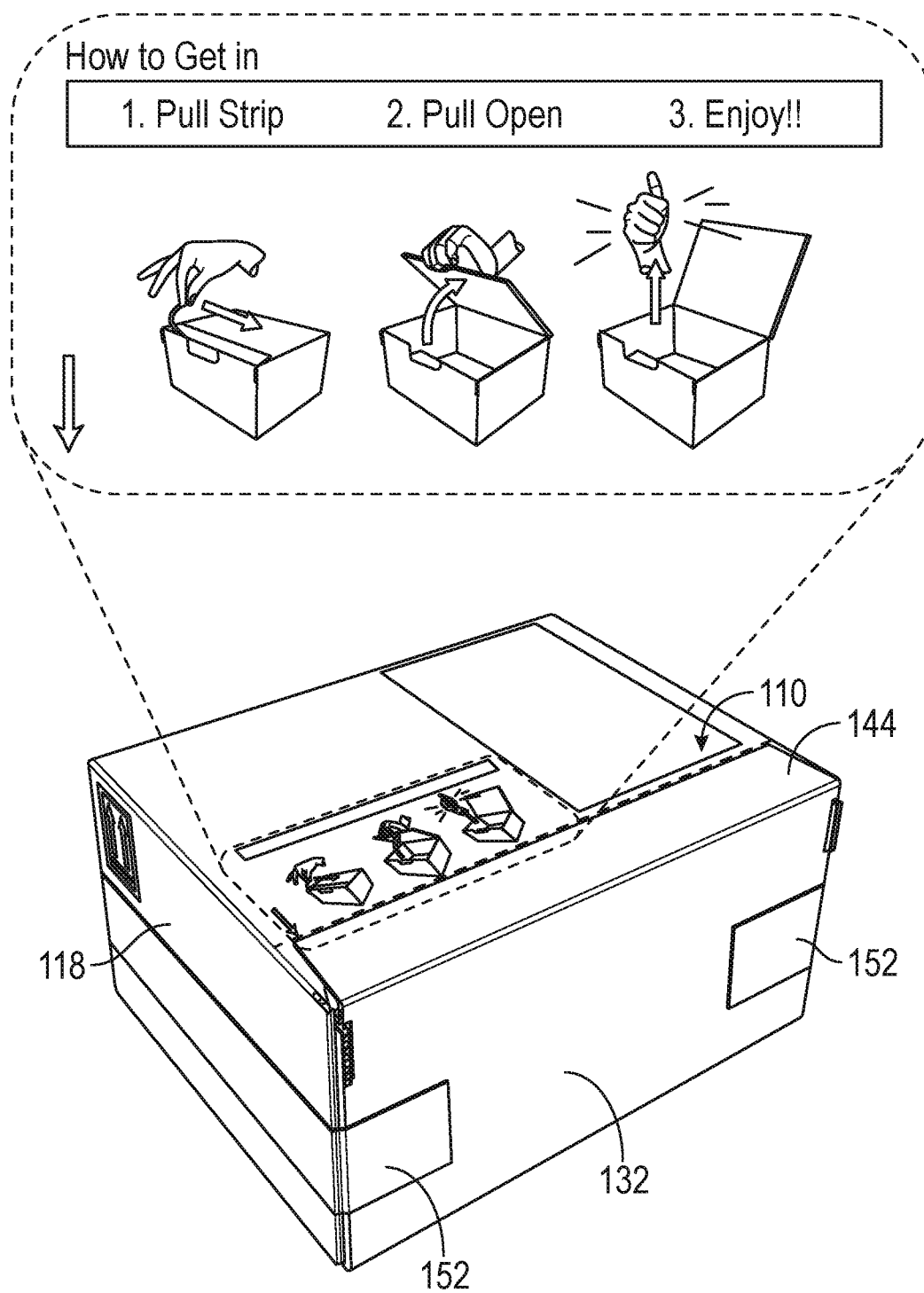
FIG. 6 illustrates an exemplary embodiment of a container formed from the blank of FIG. 1.

FIG. 6 shows the closed container and provides an enlarged view of a graphic on a cover panel 110 of the container. In this embodiment, the cover panel 110 includes a graphic that provides visual and textual instructions for opening the container.

Accordingly, as shown in the figures and discussed above, a container and method for manufacturing a novel container are provided herein. This system mitigates difficulties with conventional containers by providing a blank with graphics on a single-side that can be converted into a container with the graphics on both the inside and outside of the container.

The containers described herein can be used for various purposes, including shipping or displaying products. For shipping purposes, such as shipping to a consumer, the advantages include providing an improved user experience (i.e., the "unboxing" experience) as well as providing relevant and helpful information to the consumer when the product is opened. For example, product instructions, additional product information, advertisements, warnings, or any other relevant information can be printed on the inside of the box, including on the inside of the cover panel which is the most visible during opening. The containers disclosed herein can also be for e-Commerce subscription services in which the unboxing experience may be particularly desirable for consumers.

For display purposes, it can be beneficial to provide a container that is suitable for display at a retail site. For example, as shown in FIG. 5 (step 222), the opened container can be used to convey messaging about the product on the inside of the cover panel. This can allow the package to be shipped directly to a retail location and then readily displayed at the retail side without having to remove the individual product items from the container.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A closed container formed from a blank that has a first side and a second side, one or more graphics being provided on the first side of the blank, the container comprising:
    a base portion forming an enclosure, the base portion being formed from a plurality of panels of the blank, the plurality of panels including a back panel, a bottom panel, a front panel, a left side wall, and a right side wall;
    a first overlap panel having a first end and a second end, the first overlap panel extending from the back panel at the first end, the first overlap panel having a back surface and a front surface;
    a second overlap panel extending from the second end of the first overlap panel, the second overlap panel having a back surface and a front surface; and
    a left side panel extending from the second overlap panel and a right side panel extending from the second overlap panel,
    wherein the enclosure has an interior surface formed by portions of the back panel, the bottom panel, the front panel, the left side wall, and the right side wall that are on the first side of the blank,
    wherein a back surface of the first overlap panel is secured to a back surface of the second overlap panel to form a two-layer cover panel that encloses the interior surface of the container, the back surfaces of the first and second overlap panels being surfaces on the second side of the blank, and
    wherein the closed container comprises a first portion of the one or more graphics provided on the first side of the blank, on an outside surface of the closed container and a second portion of the one or more graphics, provided on the first side of the blank, on an inside surface of the closed container, such that the second portion is visible when the closed container is opened.

2. The container of claim 1, wherein the left side panel is secured to an exterior surface of the left side wall and the right side panel is secured to an exterior surface of the right side wall, the portion of the left side panel that is secured to the exterior surface of the left side wall is from the second side of the blank, and the portion of the right side panel that is secured to the exterior surface of the right side wall is from the second side of the blank.

3. The container of claim 2, wherein the exterior surface of the left side panel and the exterior surface of the right side panel have at least a portion of the one or more graphics.

4. The container of claim 1, wherein the cover panel has a top surface and a bottom surface, and both the top and bottom surfaces of the cover panel have at least a portion of the one or more graphics.

5. The container of claim 1, further comprising an extension member that extends from the front panel, the extension member being secured to the cover panel.

6. The container of claim 5, further comprising a tear strip disposed adjacent a joint between the extension member and the front panel.

7. The container of claim 6, wherein the tear strip is secured to a surface of the extension member.

8. The container of claim 6, wherein the tear strip is embedded within the extension member.

9. The container of claim 1, wherein the container is formed from corrugated fiberboard.

10. The container of claim 1, wherein the second side of the blank does not have any graphics on its surface.

11. A closed container formed from a blank that has a first side and a second side, the first side having one or more graphics provided thereon, the container comprising:
    a base portion forming an enclosure;
    a first overlap panel having a first end and a second end, the first overlap panel extending from a back panel of the base portion, the first overlap panel having a back surface and a front surface;
    a second overlap panel extending from the second end of the first overlap panel, the second overlap panel having a back surface and a front surface;
    a left side panel extending from the second overlap panel and a right side panel extending from the second overlap panel,
    wherein a back surface of the first overlap panel is secured to a back surface of the second overlap panel to form a two-layer cover panel that encloses the interior surface of the container, the back surfaces of the first and second overlap panels being surfaces on the second side of the blank, and
    wherein at least a portion of the one or more graphics, provided on the first side of the blank, are on the front surface of the first overlap panel and the front surface of the second overlap panel, the front surface of the first overlap panel forming an inside surface of the closed container and the front surface of the second overlap panel forming an outside surface of the closed container.

12. The container of claim 11, wherein the exterior surface of the left side panel and the exterior surface of the right side panel have at least a portion of the one or more graphics.

13. The container of claim 11, further comprising an extension member that extends from a front panel of the base portion, the extension member being secured to the cover panel.

14. The container of claim 13, further comprising a tear strip disposed adjacent a joint between the extension member and the front panel.

15. The container of claim 14, wherein the tear strip is secured to a surface of the extension member.

16. The container of claim 14, wherein the tear strip is embedded within the extension member.

17. The container of claim 11, wherein the container is formed from corrugated fiberboard.

18. The container of claim 11, wherein the second side of the blank does not have any graphics on its surface.

\* \* \* \* \*